United States Patent [19]

Okamura et al.

[11] Patent Number: 4,668,616

[45] Date of Patent: May 26, 1987

[54] PROCESS FOR HARDENING GELATIN

[75] Inventors: Hisashi Okamura; Hiroshi Kawamoto, both of Kanagawa, Japan

[73] Assignee: Fuji Photo Film Co., Ltd., Kanagawa, Japan

[21] Appl. No.: 800,860

[22] Filed: Nov. 22, 1985

[30] Foreign Application Priority Data

Nov. 28, 1984 [JP] Japan ............................... 59-250772

[51] Int. Cl.[4] ............................ G03C 1/30; C09H 7/00

[52] U.S. Cl. .................................... 430/621; 430/623; 530/354

[58] Field of Search ................ 430/621, 623; 260/112, 260/117; 530/354; 106/125

[56] References Cited

U.S. PATENT DOCUMENTS

| | | | |
|---|---|---|---|
| 3,125,449 | 3/1964 | Jeffreys | 430/621 |
| 3,392,023 | 7/1968 | Burness | 430/621 |
| 3,511,849 | 5/1970 | Wilson | 430/623 |
| 3,826,788 | 7/1974 | Froehlich et al. | 430/626 |
| 3,992,366 | 11/1976 | Stauner et al. | 430/623 |
| 4,039,520 | 8/1977 | Habu et al. | 430/621 |
| 4,063,952 | 12/1977 | Himmelmann et al. | 430/623 |

OTHER PUBLICATIONS

Chemical Abstracts, vol. 67, 1967, p. 30, 3119q (Jain et al.).

*Primary Examiner*—Won H. Louie

*Attorney, Agent, or Firm*—Sughrue, Mion, Zinn, Macpeak & Seas

[57] ABSTRACT

A method for hardening gelatin is disclosed, which comprises incorporating in a gelatin-containing material at least one compound represented by formula (I)

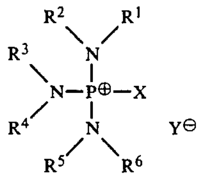

(I)

wherein $R^1$, $R^2$, $R^3$, $R^4$, $R^5$, and $R^6$ each represents an alkyl group, an alkenyl group, an aralkyl group, or an aryl group, or any two of $R^1$, $R^2$, $R^3$, $R^4$, $R^5$, and $R^6$ are bound to each other to form a ring, or any three or more of them are bound to each other to form a condensed ring, X represents a group capable of being eliminated when the compound represented by formula (I) reacts with a nucleophilic reagent, and Y⊖ represents an anion.

14 Claims, No Drawings

PROCESS FOR HARDENING GELATIN

FIELD OF THE INVENTION

This invention relates to a process for hardening gelatin using an improved hardener, and more particularly to a process for hardening gelatin used for silver halide photographic light-sensitive material.

BACKGROUND OF THE INVENTION

Gelatin is commonly used in a layered form as a binder in many photographic light-sensitive materials. It has so far been known to harden gelatin using various compounds for the purposes of enhancing water resistance and mechanical strength of the gelatin layer.

For example, known hardeners include aldehyde compounds such as formaldehyde and glutaraldehyde, compounds having a reactive halogen or halogens as described in U.S. Pat. No. 3,288,775, etc., compounds having a reactive, ethylenically unsaturated bond or bonds as described in U.S. Pat. No. 3,642,486, Japanese Patent Publication No. 13563/74, etc., aziridine compounds as described in U.S. Pat. No. 3,017,280, etc., epoxy compounds as described in U.S. Pat. No. 3,091,537, etc., halogen-carboxylaldehydes such as mucochloric acid, etc., dioxanes such as dihydroxydioxane, dichlorodioxane, etc., and inorganic hardeners such as chromium alum, zirconium sulfate, etc.

However, when used in photographic light-sensitive materials, all of these known gelatin hardeners have some drawbacks, such as that only insufficient hardening effect is provided, that hardening degree varies with a long period of time, called "post-hardening", due to slow hardening reaction with gelatin, that detrimental influences (particularly, increase of fog, reduction of sensitivity, etc.) are exerted on the properties of photographic light-sensitive materials, that hardening effect is lost due to other coexisting photographic additives, or that effects of other photographic additives (for example, couplers for color light-sensitive materials) are deteriorated.

As hardeners which cause comparatively rapid hardening reaction with gelatin, and therefore, cause less post-hardening, there are known compounds having a dihydroquinoline skeleton, described in. U.S. Pat. No. 4,013,468; compounds having a phosphorus-halogen bond, described in Japanese patent application (OPI) No. 113929/83 (the term "OPI" as used herein refers to a "published unexamined Japanese patent application"); compounds having an N-sulfonyloximido group, described in U.S. Pat. No. 4,111,962; compounds having two or more N-acyloxyimino groups within them, described in Japanese Patent Publication No. 22089/78; N-carbamoylpyridinium salts described in U.S. Pat. Nos. 3,880,665 and 4,063,952; and 2-sulfonyloxypyridinium salts described in Japanese patent application (OPI) No. 110762/81.

These hardeners have the characteristic properties that they cause less post-hardening due to their fast hardening action. However, although they cause a fast hardening reaction with gelatin, at the same time they are subject to the side reaction of being decomposed with water. Therefore, in the common process of preparing light-sensitive material using a gelatin aqueous solution, the efficiency of the hardener is so low that, in order to obtain a gelatin membrane with a desired hardening degree, a large amount of hardener must be used.

Hardeners as described in U.S. Pat. Nos. 3,880,665 and 4,063,952, Japanese patent application (OPI) No. 110762/81, etc., are generally believed to undergo a nucleophilic attack with carboxyl or amino group of gelatin to react therewith, thus hardening gelatin. In preparing gelatin membrane, an aqueous gelatin solution is usually used. Since coexisting water has some nucleophilic properties, it unavoidably tends to react with the hardener to decompose and render the hardener powerless. This tendency is serious with those hardeners which show a fast hardening action. Therefore, in order to harden gelatin rapidly with good efficiency, development of hardeners which react with carboxyl groups, amino groups or the like of gelatin fast than with water, i.e., which well selectively react with gelatin, is of great importance. Hardeners such as N-carbamoylpyridinium salts and 2-sulfonyloxypyridinium salts have the defect that they have such a poor efficiency, which may be attributed to low selectivity as described above, that hardeners which have a higher efficiency, which harden gelatin rapidly, and which have a high water solubility have been eagerly desired to be developed.

SUMMARY OF THE INVENTION

An object of the present invention is to provide a process for hardening gelatin by using a novel gelatin hardener.

Another object of the present invention is to provide gelatin hardeners which can rapidly harden gelatin, and which cause less post-hardening.

A further object of the. present invention is to provide gelatin hardeners which react with reactive groups of gelatin with high selectivity, to thereby effectively harden gelatin.

These and other objects of the present invention will become apparent from the following description thereof.

As a result of intensive investigations, the inventors have found that the above-described and other objects of the present invention can be attained by incorporating in a gelatin-containing material as gelatin hardeners the compounds represented by formula (I)

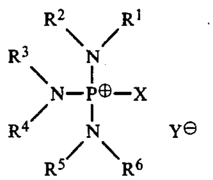

(I)

wherein $R^1$, $R^2$, $R^3$, $R^4$, $R^5$, and $R^6$ (which may be the same or different and include substituted groups) each represents an alkyl group, an alkenyl group, an aralkyl group, or an aryl group or any two of $R^1$, $R^2$, $R^3$, $R^4$, $R^5$, and $R^6$ are bound to each other to form a ring, or any three or more of them are bound to each other to form a condensed ring, X represents a group capable of being eliminated when the compound represented by formula (I) reacts with a nucleophilic reagent, and $Y^\ominus$ represents an anion.

The $Y^\ominus$ may be bound to any of X, $R^1$, $R^2$, $R^3$, $R^4$, $R^5$, and $R^6$ to form an inner salt.

DETAILED DESCRIPTION OF THE INVENTION

In more detail, $R^1$, $R^2$, $R^3$, $R^4$, $R^5$, and $R^6$ are preferably straight or branched chain alkyl groups containing from 1 to 20 carbon atoms (e.g., a methyl group, an ethyl group, a butyl group, a 2-ethylhexyl group, a dodecyl group, etc.), aralkyl groups containing from 6 to 20 carbon atoms (e.g., a benzyl group, a phenethyl group, a 3-pyridylmethyl group, etc.), or aryl groups containing from 5 to 20 carbon atoms (e.g., a phenyl group, a naphthyl group, a pyridyl group, etc.), which may be the same or different. $R^1$, $R^2$, $R^3$, $R^4$, $R^5$, and $R^6$ may include one or more substituents, and examples of the substituent include a halogen atom, an alkoxy group containing from 1 to 20 carbon atoms, an aryloxy group containing from 6 to 20 carbon atoms, an N,N-disubstituted carbamoyl group, etc.

In addition, any two of $R^1$, $R^2$, $R^3$, $R^4$, $R^5$, and $R^6$ may be bound to each other to form a ring. Examples of $R^1$ and $R^2$, $R^3$ and $R^4$, or $R^5$ and $R^6$ being bound to each other to form a ring together, with the nitrogen atom include the cases of forming a pyrrolidine ring, a piperadine ring, a perhydroazepine ring, a morpholine ring, a pyrrole ring, etc.

X is a group capable of being eliminated when the compound represented by formula (I) reacts with a nucleophilic reagent, and preferable examples thereof include a halogen atom, a sulfonyloxy group, a 1-pyridinyl group, an imidyloxy group (e.g., a succinimidyloxy group, a glutarimidyloxy group, a phthalimidyloxy group, etc.), an azolyloxy group (e.g., a 1-benzotriazolyloxy group, etc.), etc.

$Y^\ominus$ represents an anion, and examples thereof include a halide ion, a sulfonate ion, a sulfate ion, a phosphonate ion, a phosphate ion, $BF^\ominus_4$, $ClO^\ominus_4$, $PF^\ominus_6$, etc. with $Cl^\ominus$, $BF^\ominus_4$, $ClO^\ominus_4$, $PF^\ominus_6$, and a sulfonate ion being particularly preferable.

Examples of the compounds which can be used in the present invention are shown below; however, these do not limit the present invention in any way.

$\{(CH_3)_2N\}_3P^\oplus—Cl\ Cl^\ominus$ Compound 1

$\{(CH_3)_2N\}_3P^\oplus—Cl\ BF_4^\ominus$ Compound 2

$\{(CH_3)_2N\}_3P^\oplus—Cl\ PF_6^\ominus$ Compound 3

Compound 4

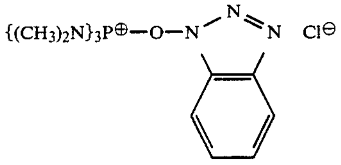

Compound 5

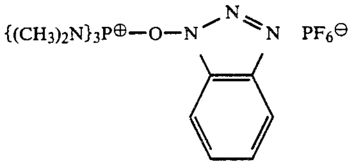

Compound 6

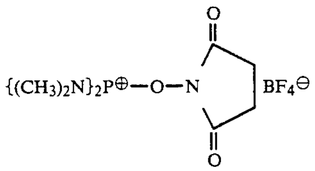

-continued

Compound 7

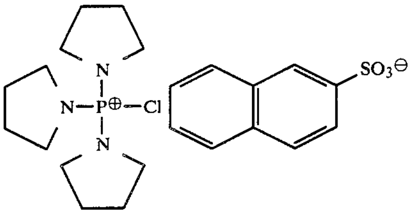

Compound 8

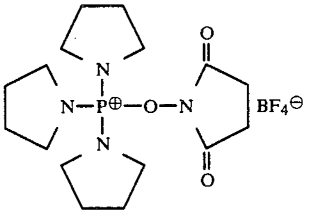

Compound 9

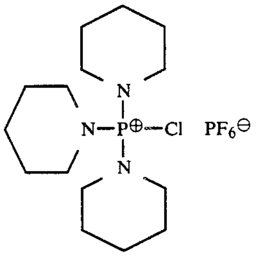

Compound 10

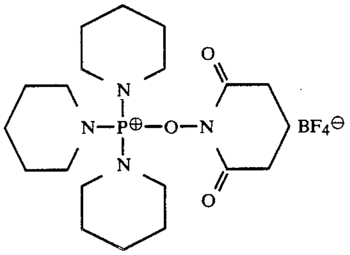

Compound 11

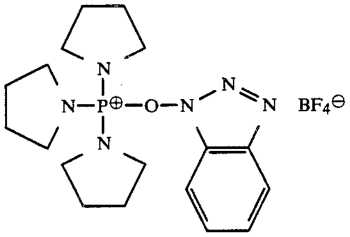

Compound 12

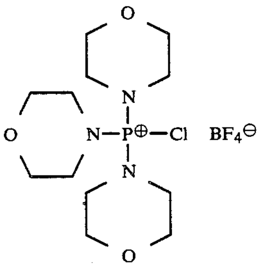

Synthesis examples of these compounds of the present invention are described below.

SYNTHESIS EXAMPLE 1

(Synthesis of Compound I)

18 ml of trichloromethyl chlorocarbonate was gradually added to a solution of 17.9 g of N,N,N',N',N'',N''-hexamethylphosphoric acid triamide in 40 ml of 1,2-dichloroethane while cooling with ice. The temperature was then restored to room temperature (about 20° C.), and the solution was stirred overnight, followed by concentrating under reduced pressure. The solidified residue was well pulverized, then washed three times with 200 ml of ether (with decantation). Drying of the product under reduced pressure gave Compound 1 (yield: 16.4 g).

Chemical structure of the compound was confirmed by the NMR (Nuclear Magnetic Resonance) spectrum and elemental analysis.

SYNTHESIS EXAMPLE 2

(Synthesis of Compound 2)

A solution of 21 g of $NH_4BF_4$ in 150 ml of water was added to 23.4 g of Compound 1 while cooling, followed by stirring for 5 minutes. Crystals precipitated were collected by filtration, washed well with cold water, then dried. Recrystallization of the crystals from 300 ml of acetone gave 6.2 g of Compound 2.

Chemical structure of Compound 2 was confirmed by the NMR spectrum and elemental analysis.

SYNTHESIS EXAMPLE 3

(Synthesis of Compound 5)

14 ml of triethylamine was dropwise added to a solution of 23.4 g of Compound 1 and 13.5 g of 1-hydroxybenzotriazole in 50 ml of methylene chloride in 10 minutes at a temperature of 0° C. or lower than that. After restoration of the temperature of the solution to room temperature and one-hour stirring of the solution, a precipitate formed was removed by filtration, and the filtrate was concentrated under reduced pressure. A solution of 20 g of $NH_4PF_6$ in 100 ml of water was added to the residue while cooling, and crystals precipitated were collected by filtration. The crystals were washed well with cold water, dried under reduced pressure, then dissolved in a small amount of methylene chloride. Ether was added to the solution, and crystals precipitated were collected by filtration and dried to obtain 20.7 g of Compound 5.

Chemical structure of Compound 5 was confirmed by the NMR spectrum and elemental analysis.

Compounds other than the compounds described in above Synthesis Examples may also be synthesized according to these processes or analogous processes thereof.

When these compounds are applied to gelatin-containing photographic layers as hardeners, unfavorable phenomena such as fogging, deterioration of photographic properties (e.g., desensitization), formation of stains, reaction with couplers contained in color photographic light-sensitive materials, etc., are scarcely observed. In addition, hardening proceeds so rapidly that hardening degree reaches its final level within a few days after coating, after which the hardening degree does not increase, i.e., substantially no post-hardening is observed.

The amount of the hardener of the present invention to be used may be freely selected according to the particular end-use intended. Usually, the hardener can be used in an amount of from 0.01 to 20 wt % based on the weight of dry gelatin (i.e., dry to the touch), particularly preferably from 0.05 to 10 wt %.

The hardeners of the present invention can be used for all photographic light-sensitive materials using gelatin. For example, they can be used for color negative films, color reversal films, color positive films, color photographic printing papers, color reversal photographic printing papers, color light-sensitive materials of color diffusion transfer process or silver-dye bleach process, and black-and-white light-sensitive materials such as black-and-white films, X-ray films, films for a photomechanical process, black-and-white photographic printing papers, aerial photographic films, microfilms, facsimile, photocomposing films or printing papers, and graphic films.

In applying to these materials, photographic layers to which the hardener of the present invention is added are not particularly limited, and may be added to any gelatin-containing photographic layer including light-insensitive layers such as a subbing layer, a backing layer, a filter layer, an interlayer, an overcoating layer, etc., as well as silver halide emulsion layers.

The hardeners of the present invention may be used alone or as a combination of two or more. Further, they may be used in combination with other conventionally known hardeners (e.g., vinylsulfon group-containing hardeners, 2,4-dichloro-6-hydroxy-s-triazine, etc.).

Compounds capable of accelerating hardening of gelatin may be used in combination with the hardeners of the present invention. Such hardening accelerators include, for example, aprotic solvents, surfactants, tertiary amines or salts thereof, various inorganic salts, polyhydric alcohols, sulfinic acid-containing polymers, etc. Of course, the hardeners of the present invention may be used in combination with both the aforesaid known hardeners and such hardening accelerators.

Gelatin to which the hardener of the present invention is applied may be any of so-called alkali-processed (or lime-processed) gelatin which has been dipped in an alkali bath in the gelatin production process before being extracted; acid-processed gelatin having been dipped in an acid bath; double-dipped gelatin having been subjected to the both processings; and enzyme-processed gelatin as described in *Bull. Soc. Sci. Photo. Japan*, No. 16, p. 30 (1966). Further, the hardener of the present invention can be applied to a low-molecular weight gelatin prepared through partial hydrolysis of these gelatins by heating in a water bath or by having protease act thereon.

Gelatins to which the hardeners of the present invention are applied may, if desired, be partly replaced by colloidal albumin, casein, cellulose derivatives (e.g., carboxymethyl cellulose, hydroxyethylcellulose, etc.), sugar derivatives (e.g., agar-agar, sodium alginate, starch derivatives, etc.), synthetic hydrophilic colloids (e.g., polyvinyl alcohol, poly-N-vinylpyrrolidone, polyacrylic acid copolymer, polyacrylamide or derivatives or partially hydrolyzed products thereof, etc.), or by so-called gelatin derivatives prepared by treating gelatin with a reagent having one group capable of reacting with a functional group contained in the gelatin, i.e., an amino group, an imino group, a hydroxy group, or a carboxy group to thereby modify gelatin, or graft polymers prepared by grafting a molecular chain of other high molecular substance.

In using the hardener of the present invention in a photographic light-sensitive material, a water-insoluble or sparingly water-soluble synthetic polymer dispersion may be incorporated in photographic emulsion layers and other hydrophilic colloidal layers for the purpose of improving dimensional stability.

In using the gelatin hardener of the present invention for photographic light-sensitive materials, it may be used together with a matting agent. As a matting agent, fine particles of water-insoluble organic or inorganic compound having a mean particle size (diameter) of from 0.2 μm to 10 μm are preferable.

In using the hardener of the present invention for photographic light-sensitive materials, the photographic light-sensitive materials may contain dye-forming couplers, i.e., yellow (dye-forming) couplers, magenta couplers, and cyan couplers alone or as a combination thereof.

Typical examples of the magenta coupler include 5-pyrazolones and pyrazoloazoles (e.g., pyrazolopyrazole, pyrazoloimidazole, pyrazolotriazole, pyrazolotetrazole, etc.), etc.

In using the hardener of the present invention for photographic light-sensitive materials, any of silver bromide silver iodobromide, silver iodochlorobromide, silver chlorobromide, and silver chloride may be used as the silver halide.

Average grain size (grain diameter with respect to spherical or approximately spherical grains, and edge length with respect to cubic grains; presented as an average based on projected areas) and distribution of grain size are not particularly limited.

Silver halide grains in the photographic emulsion may be in a regular crystal form such as cubic or octahedral form, in an irregular crystal form such as spherical or platelike form, or in a composite form thereof, or may comprise a mixture of grains in different forms.

Further, emulsions in which tabular silver halide grains having a diameter-to-thickness ratio of 5 or more account for 50% or more based on the total projected area may be used.

The photographic emulsion to be used in the present invention may be spectrally sensitized.

The photographic light-sensitive material prepared according to the present invention may contain in its photographic emulsion layers or other hydrophilic colloidal layers various surface active agents for various purposes, such as for improvement of coating properties, antistatic properties, sliding properties, emulsion dispersion, antiadhesion properties, and photographic properties (for example, development acceleration, increasing high contrast, sensitization, etc.).

For example, there can be used nonionic surface active agents such as saponins (steroid type), alkylene oxide derivatives (e.g., polyethylene glycol, polyethylene glycol/polypropylene glycol condensate, polyethylene glycol alkyl ethers, polyethylene glycol alkylaryl ethers, polyethylene glycol esters, polyethylene glycol sorbitan esters, polyalkylene glycol alkylamines or amides, silicon-polyethylene oxide adducts, etc.), glycidol derivatives (e.g., alkenylsuccinic acid polyglyceride, alkylphenol polyglyceride, etc.), polyhydric alcohol fatty acid esters, saccharide alkyl esters, etc.; anionic surface active agents having an acidic group such as a carboxy group, a sulfo group, a phospho group, a sulfuric acid ester group, or a phosphoric ester group (e.g., alkylcarboxylates, alkylsulfonates, alkylbenzenesulfonates, alkylnaphthalenesulfonates, alkylsulfates, alkyl phosphates, N-acyl-N-alkyltaurines, sulfosuccinates, sulfoalkyl polyoxyethylene alkylphenyl ethers, polyoxyethylene alkyl phosphates, etc.; amphoteric surfactants such as amino acids, aminoalkylsulfonic acids, aminoalkyl sulfates or phosphates, alkylbetaines, amine oxides, etc.; and cationic surfactants such as alkylamine salts, aliphatic or aromatic quaternary ammonium salts, heterocyclic quaternary ammonium salts (e.g., pyridinium, imidazolium, etc.), phosphonium or sulfonium salts containing aliphatic or heterocyclic ring, etc.

Of these, fluorine-containing surfactants and polyalkylene oxide group-containing surfactants can be particularly preferably used.

To the photographic emulsion prepared by the present invention may be incorporated various compounds for the purpose of preventing formation of fog or stabilizing photographic properties in the steps of producing, or during storage or photo-processing of, light-sensitive materials. That is, azoles (e.g., benzothiazolium salts, nitroimidazoles, nitrobenzimidazoles, chlorobenzimidazoles, bromobenzimidazoles, nitroindazoles, benzotriazoles, aminotriazoles, etc.); mercapto compounds (e.g., mercaptothiazoles, mercaptobenzothiazoles, mercaptobenzimidazoles, mercaptothiadiazoles, mercaptotetrazoles (particularly, 1-phenyl-5-mercaptotetrazole), mercaptopyrimidines, mercaptotriazines, etc.); thioketo compounds such as oxazolinethione; azaindenes (e.g., triazaindenes, tetrazaindenes (particularly 4-hydroxy-substituted (1,3,3a,7)tetrazaindenes), pentazaindenes, etc.); benzenethiosulfonic acid, benzenesulfinic acid, benzenesulfonic acid amide, etc., known as antifoggants or stabilizers can be added.

More detailed specific examples of these compounds and the manner of using them are described, for example, in U.S. Pat. Nos. 3,954,474 and 3,982,947, Japanese Patent Publication No. 28660/77, etc.

The light-sensitive material prepared by using the present invention may contain in its hydrophilic colloidal layer(s) an ultraviolet ray absorbent.

The light-sensitive material prepared by using the present invention may also contain in its hydrophilic colloidal layer(s) a water-soluble dye as a filter dye or for various purposes including prevention of irradiation.

Where the light-sensitive material prepared by using the present invention contains in its hydrophilic colloidal layer(s) a dye, an ultraviolet ray absorbent, and the like, they may be mordanted with a cationic polymer or the like.

The light-sensitive material prepared by using the present invention may contain hydroquinone derivatives, aminophenol derivatives, gallic acid derivatives, ascorbic acid derivatives, etc., as color antifoggants.

In the practice of the present invention, known fading preventing agents can be used in combination. The color image stabilizers used in the present invention may be used alone or as a combination of two or more. As to these photographic additives, reference may be made to *Research Disclosure,* Vol. 176, pp. 22–29 (December 1978).

Any of known processes and processing solutions described, for example, in *Research Disclosure,* Vol. 176, pp. 28–30 (December 1978) may be applied to photographic processing of layers comprising the photographic emulsion prepared by using the present invention.

The gelatin-hardening process of the present invention can be preferably used not only for photographic light-sensitive materials, but also in any industry using hardened gelatin.

For example, the present invention can be applied to the hardening of microcapsules described, for example, in U.S. Pat. No. 4,016,098.

The present invention is now illustrated in greater detail by reference to the following examples, which, however, are not to be construed as limiting the present invention in any way.

EXAMPLE 1

Each of Compound 2 and Compound 5 in accordance with the present invention, comparative compound (II) described in U.S. Pat. No. 4,063,952 (Illustrative Compound 15), and comparative compound (III) disclosed in U.S. Pat. No. 3,642,486 (Example II) was added to a 7% gelatin aqueous solution in an amount shown in Table 1, and each of the resulting solutions was uniformly coated on a cellulose triacetate support in a dry thickness of about 8 μm, then dried to prepare gelatin membranes (A) to (G). Also, gelatin membrane (H) containing absolutely no hardeners was prepared as a control. These samples were left in an environment of 25° C. and 50% RH (relative humidity), and part of each sample was taken out at stages of 2 hours, one day, 3 days, and 7 days after coating in order to determine a crosslinking coefficient (crosslinking unit numbers per weight-average molecular weight before crosslinking), δ, according to the following method. Method of determining crosslinking coefficient, δ:

Each gelatin membrane was delaminated from the support, and the weight thereof, $M_1$, was measured. A sol component was extracted from each of the gelatin membranes with warm water, and the gelatin weight thereof, $M_2$, was determined by microbiuret method using a biuret reaction. The sol fraction, S, was calculated according to the following formula using the results thus obtained.

$$S = \frac{M_2}{M_1}$$

δ was calculated using the thus calculated value, S, according to the following formula described in A. Charlesby, *Atomic Radiation and Polymers,* (published by Pergamon Press, 1960), pp. 134–158.

$$\delta = \frac{2}{S + \sqrt{S}}$$

δ values of gelatin membranes (A) to (H) at respective stages are tabulated in Table 1.

TABLE 1

| Gelatin Membrane | Hardener | Added Amount (per 100 g of dry gelatin) | δ After 2 hrs. | δ After 1 day | δ After 3 days | δ After 7 days |
|---|---|---|---|---|---|---|
| (A) | Compound 2 of the present invention | 10 mmol | 2.9 | 3.0 | 2.9 | 3.0 |
| (B) | Compound 2 of the present invention | 20 mmol | 5.1 | 5.0 | 5.2 | 5.0 |
| (C) | Compound 5 of the present invention | 10 mmol | 3.3 | 3.4 | 3.4 | 3.3 |
| (D) | Compound 5 of the present invention | 20 mmol | 5.3 | 5.5 | 5.5 | 5.5 |
| (E) | Comparative compound II | 10 mmol | 2.8 | 2.7 | 2.7 | 2.8 |
| (F) | Comparative compound II | 20 mmol | 4.5 | 4.3 | 4.4 | 4.4 |
| (G) | Comparative compound III | 5 mmol | 1.2 | 3.4 | 5.6 | 6.4 |
| (H) | None (control) | 0 mmol | 1.0 | 1.0 | 1.0 | 1.0 |

Comparative Compound (II) 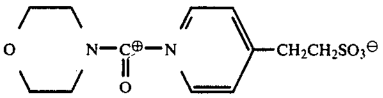

Comparative Compound (III) $CH_2{=}CHSO_2CH_2OCH_2SO_2CH{=}CH_2$ $Na^{\oplus}Cl^{\ominus}$ As is seen from the results set forth in Table 1, all of gelatin membranes (A) to (D) using Compound 2 or 5 of the present invention underwent such a fast hardening action that hardening reaction completed in about 2 hours after the coating and, after that, δ did not change.

Comparative compound (II) showed about the same fast hardening action as Compounds 2 and 5, but, in comparison with the systems using Compound 2 or 5 in the equimolar amounts (gelatin membranes (A) and (C) with (E), or (B) and (D) with (F)), (II) provided a lower δ, which may be probably attributed to its poor selectivity between reactive residues of gelatin and water, thus having less efficiency as a hardener.

On the other hand, comparative compound (III) showed a slow hardening action, and δ increased even after 3 days (post-hardening).

It is apparent, from the above results, that Compounds 2 and 5 of the present invention show a fast hardening action, and are excellent hardeners with excellent efficiency.

EXAMPLE 2

Each of Compound 5 of the present invention and comparative compound (III) was added as shown in Table 2 to a high-speed negative type photographic emulsion prepared in a conventional manner and containing 120 g of gelatin and 65 g of silver iodobromide per kg, and uniformly coated in a dry thickness of 10 μm on a subbed cellulose triacetate support, then dried to prepare samples. After leaving each sample for 7 days at room temperature, the degree of swelling, Q, defined by the following formula, was measured in 25° C. water.

$$Q = \frac{\text{Film thickness increased by swelling}}{\text{Dry film thickness}}$$

Separately, a needle with a copper ball of 0.4 mm radius at its end was pressed onto the surface of each sample dipped in water, and was allowed to run in parallel with the surface at a speed of 2.5 mm per second while continuously changing the load to the needle within the range of from 0 to 200 g to determine the load sufficient to damage the film surface.

Further, the thus obtained film samples were wedge exposed, developed at 20° C. for 8 minutes in a developer, D-76, fixed, washed with water, and dried, followed by sensitometry to determine sensitivity and fog. Results thus obtained are tabulated in Table 2.

As is clear from Table 2, the compounds of the present invention provided sufficient film strength to be practically useful without damaging photographic properties.

TABLE 2

| | | Photographic Properties | | | | Film Strength | |
|---|---|---|---|---|---|---|---|
| | Amount Added (per 100 g of dry gelatin) | 7 Days after Coating | | Accelerated conditions (50° C., 2 days) | | Q (7 Days after coating) | Scratch Resistance (g) (7 days after coating) |
| Compound | | Relative Sensitivity | Fog | Relative Sensitivity | Fog | | |
| Control | 0 | 100 | 0.06 | 100 | 0.09 | 9.9 | 7 |
| Compound 5 of the invention | 25 mmol | 91 | 0.05 | 92 | 0.05 | 4.7 | 70 |
| Comparative compound (III) | 5 mmol | 93 | 0.05 | 93 | 0.06 | 4.9 | 74 |

EXAMPLE 3

A silver iodobromide emulsion containing 3.0 mol % silver iodide was prepared, and was subjected to post ripening in the presence of sodium thiosulfate and A gold salt to obtain high-speed negative emulsion with maximum sensitivity.

This emulsion was mixed with a coupler emulsion prepared by dissolving 1-(2′,4′,6′-trichlorophenyl)-3-[3″-(2″,4″-di-t-amylphenoxyacetamido)benzamido]-5-pyrazolone in a mixture of dibutyl phthalate and tricresyl phosphate and dispersed in a gelatin solution in an o/w type using sorbitan monolaurate, Turkey red oil, and sodium dodecylbenzenesulfonate as dispersing and emulsifying agents. Then, 7.1 g (25 mmol) of Compound 5 of the present invention was added thereto per 100 g of dry gelatin, and the emulsion was coated on a subbed cellulose triacetate support in a dry thickness of about 10 μm and dried to obtain an experimental color film with a single magenta layer.

This experimental color film was wedge exposed, and subjected to color development processing using 4-amino-3-methyl-N-ethyl-β-hydroxyethylaniline sesquisulfate monohydrate as a developing agent, followed by examining colorforming properties by sensitometry.

As a result, it was found that the compound of the present invention did not damage color-forming properties of the coupler, and formed no color stains.

While the invention has been described in detail and with reference to specific embodiments thereof, it will be apparent to one skilled in the art that various changes and modifications can be made therein without departing from the spirit and scope thereof.

What is claimed is:

1. A process for hardening gelatin which comprises incorporating in a gelatin-containing light-senstive silver halide photographic material at least one compound represented by formula (I)

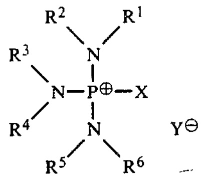

(I)

wherein $R^1$, $R^2$, $R^3$, $R^4$, $R^5$, and $R^6$ each represents an alkyl group, an alkenyl group, an aralkyl group, or an aryl group, or any two of $R^1$, $R^2$, $R^3$, $R^4$, $R^5$, and $R^6$ are bound to each other to form a ring, or any three or more of them are bound to each other to form a condensed ring, X represents a group capable of being eliminated when the compound represented by formula (I) reacts with a nucleophilic reagent, and $Y^\ominus$ represents an anion.

2. A process for hardening gelatin as in claim 1, wherein $R^1$, $R^2$, $R^3$, $R^4$, $R^5$, and $R^6$ each represents a straight or branched chain alkyl group containing from 1 to 20 carbon atoms, an aralkyl group containing from 6 to 20 carbon atoms, or an aryl group containing from 5 to 20 carbon atoms.

3. A process for hardening gelatin as in claim 1, wherein at least one of $R^1$ and $R^2$, $R^3$ and $R^4$, and $R^5$ and $R^6$ are bound to each other to form a ring.

4. A process for hardening gelatin as in claim 3, wherein said ring is selected from the group consisting of a pyrrolidine ring, a piperadine ring, a perhydroazepine ring, a morpholine ring, and a pyrrole ring.

5. A process for hardening gelatin as in claim 1, wherein X is selected from the group consisting of a halogen atom, a sulfonyloxy group, a 1-pyridinyl group, an imidyloxy group, and an azolyloxy group.

6. A process for hardening gelatin as in claim 1, wherein $Y^\ominus$ is selected from the group consisting of a halide ion, a sulfonate ion, a sulfate ion, a phosphonate ion, a phosphate ion, $BF^\ominus_4$, $ClO^\ominus_4$ and $PF^\ominus_6$.

7. A process for hardening gelatin as in claim 1, wherein $Y^\ominus$ is selected from the group consisting of $Cl^\ominus$, $BF^\ominus_4$, $ClO^\ominus_4$, $PF^\ominus_6$, and a sulfonate ion.

8. A process for hardening gelatin as in claim 1, wherein the hardener is used in an amount of from 0.01 to 20 wt % based on the weight of dry gelatin.

9. A process for hardening gelatin as in claim 2, wherein the hardener is used in an amount of from 0.01 to 20 wt % based on the weight of dry gelatin.

10. A process for hardening gelatin as in claim 3, wherein the hardener is used in an amount of from 0.01 to 20 wt % based on the weight of dry gelatin.

11. A process for hardening gelatin as in claim 4, wherein the hardener is used in an amount of from 0.01 to 20 wt % based on the weight of dry gelatin.

12. A process for hardening gelatin as in claim 5, wherein the hardener is used in an amount of from 0.01 to 20 wt % based on the weight of dry gelatin.

13. A process for hardening gelatin as in claim 6, wherein the hardener is used in an amount of from 0.01 to 20 wt % based on the weight of dry gelatin.

14. A process for hardening gelatin as in claim 1, wherein $Y^{\ominus}$ is bound to any of X, $R^1$, $R^2$, $R^3$, $R^4$, $R^5$, and $R^6$ to form an inner salt.

* * * * *